(12) United States Patent
Olsson

(10) Patent No.: US 7,845,448 B2
(45) Date of Patent: Dec. 7, 2010

(54) TRACKED VEHICLE, ESPECIALLY A SNOW SCOOTER

(76) Inventor: Ake Olsson, Moen, NO-7340 Oppdal (NO)

( * ) Notice: Subject to any disclaimer, the term of this patent is extended or adjusted under 35 U.S.C. 154(b) by 105 days.

(21) Appl. No.: 12/066,174

(22) PCT Filed: Aug. 31, 2006

(86) PCT No.: PCT/SE2006/000998

§ 371 (c)(1),
(2), (4) Date: Mar. 7, 2008

(87) PCT Pub. No.: WO2007/030055

PCT Pub. Date: Mar. 15, 2007

(65) Prior Publication Data

US 2008/0257616 A1    Oct. 23, 2008

(30) Foreign Application Priority Data

Sep. 8, 2005   (SE) .................................. 0501987

(51) Int. Cl.
*B62M 27/02* (2006.01)

(52) U.S. Cl. ...................................... 180/192; 180/193

(58) Field of Classification Search ................. 180/192, 180/193, 185, 9.44
See application file for complete search history.

(56) References Cited

U.S. PATENT DOCUMENTS

| | | | | | |
|---|---|---|---|---|---|
| 6,006,847 | A | * | 12/1999 | Knight | 180/9.26 |
| 6,095,275 | A | * | 8/2000 | Shaw | 180/185 |
| 6,874,586 | B2 | * | 4/2005 | Boivin et al. | 180/9.26 |
| 2008/0156548 | A1 | * | 7/2008 | Mallette et al. | 180/9.1 |

FOREIGN PATENT DOCUMENTS

| | | |
|---|---|---|
| GB | 925032 | 5/1963 |
| JP | 04-071981 | 3/1992 |
| WO | WO 93/18956 | 9/1993 |

* cited by examiner

*Primary Examiner*—Tony H. Winner
(74) *Attorney, Agent, or Firm*—Dickstein Shapiro LLP

(57) ABSTRACT

A tracked vehicle, especially a snow scooter, that has two laterally spaced-apart front drive-track assemblies (10), each of which is turnable around a substantially vertical axis and which are coupled for common turning. Each drive-track assembly is carried by a vehicle chassis (11) via a vertically movable link device, which in respect of vertical turning rests against the chassis via a spring-damper assembly (7), and the drive-track assemblies are mechanically coupled by a parallel steering mechanism (23-26), which is maneuverable by a driver of the vehicle.

4 Claims, 3 Drawing Sheets

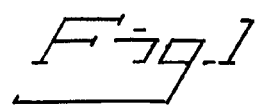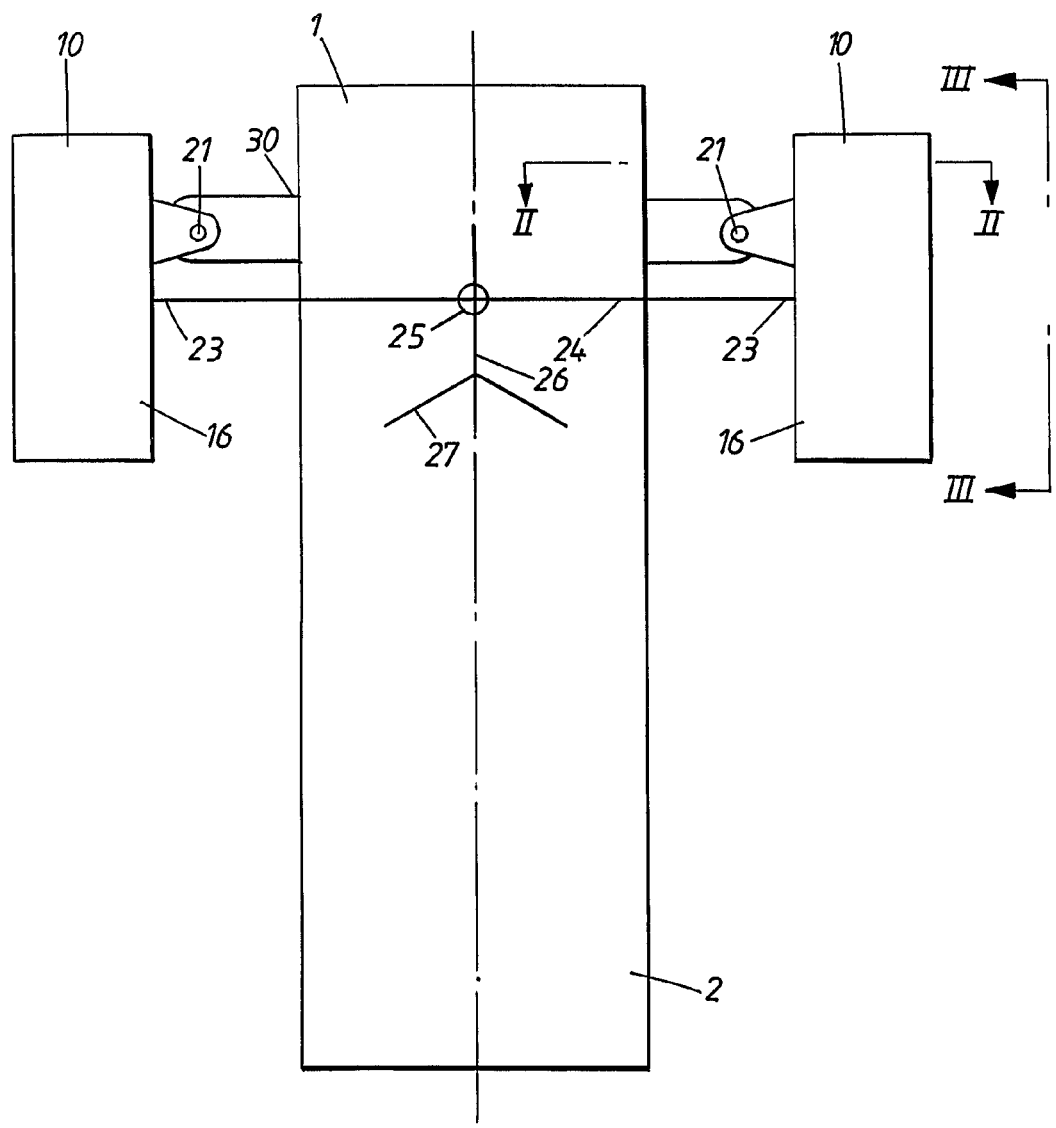

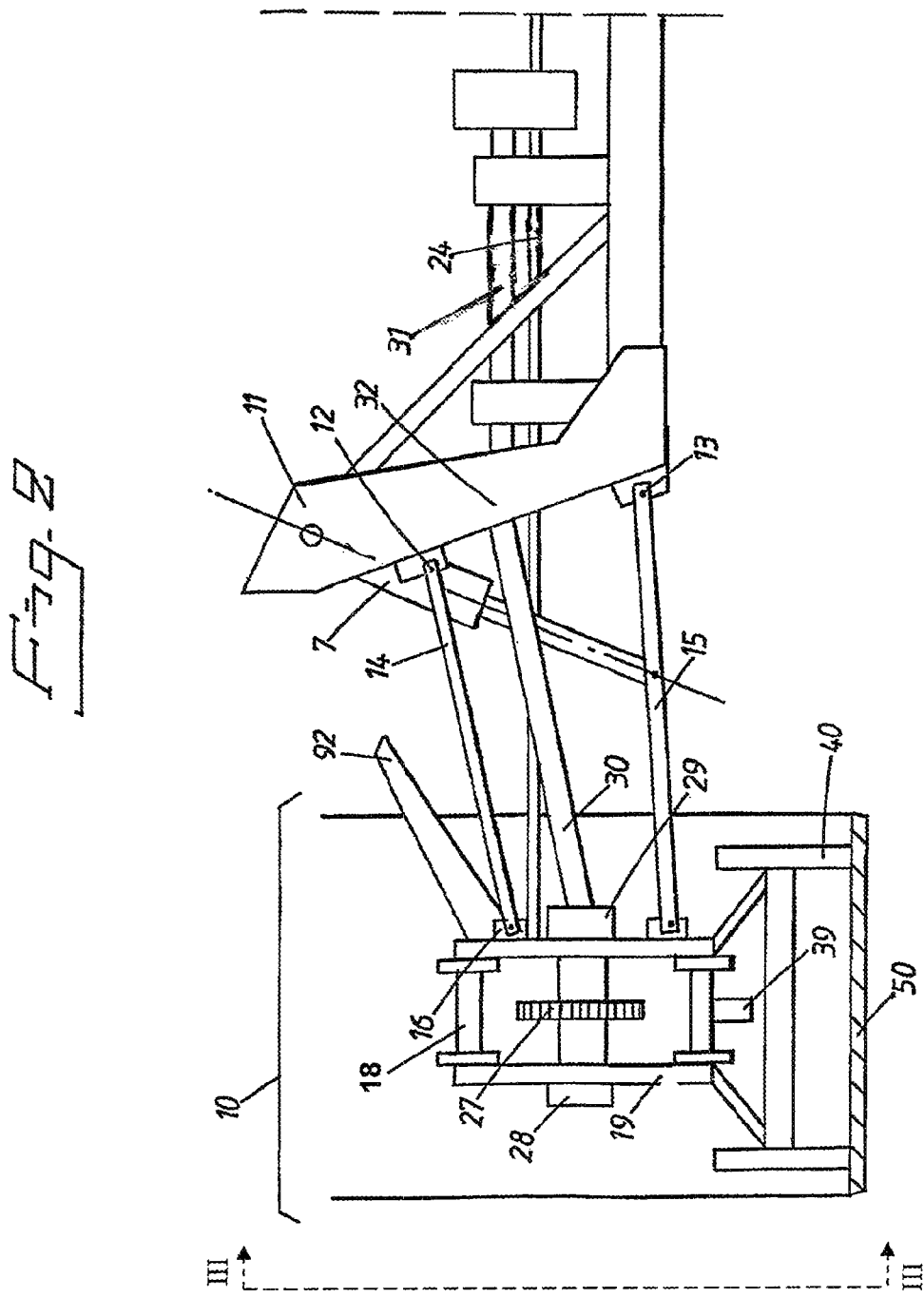

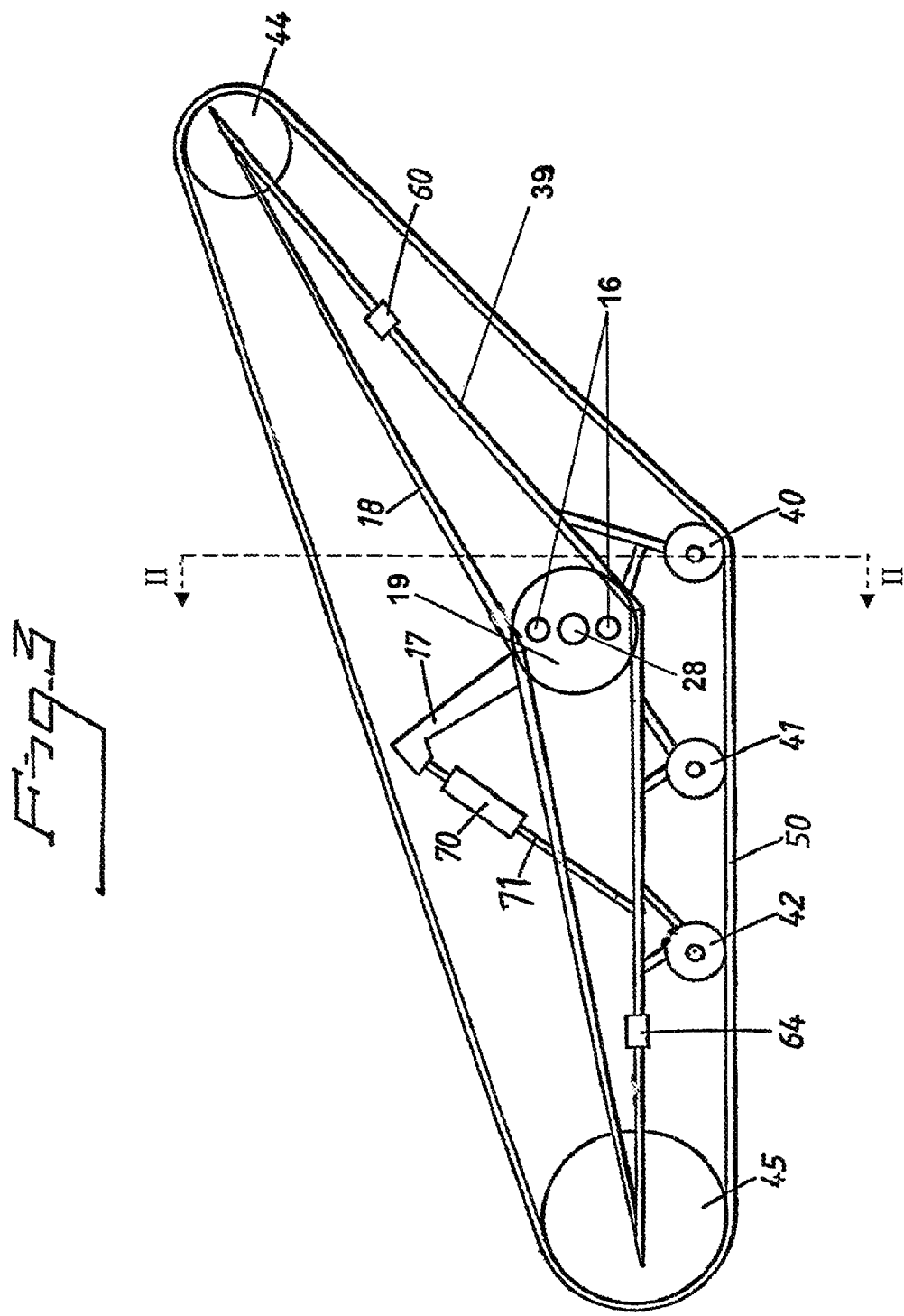

TRACKED VEHICLE, ESPECIALLY A SNOW SCOOTER

BACKGROUND OF THE INVENTION

The invention relates to a vehicle, especially a snow scooter, of the kind that is seen in the preamble of the appended claim 1.

A tracked vehicle of snow scooter type usually has two front laterally spaced-apart skid rails/skis, which are parallel and jointly turnable around a respective substantially vertical axis. Furthermore, the skis are coupled to a steering device to allow a driver of the vehicle to steer the vehicle. The skis support the vehicle from the ground, which usually is snow. Then, the driving of the vehicle is usually composed of a rear centrally positioned track unit having a track that runs all around in the longitudinal direction of the vehicle and is drivingly connected to the engine of the vehicle. The track unit supports the rear part of the vehicle from the ground and offers a driving of the vehicle.

This conventional vehicle structure, having rear track driving and front non-driven steerable skis/runners, has the advantage of offering a simple damping suspension between the chassis and the skis, but the front steerable skis is an acceptable compromise between bearing capacity and steering capacity only at a chosen speed.

GB925032A discloses a tracked vehicle of the kind that is seen in the preamble of claim 1.

WO9318956A1 discloses a snow scooter having two drive-track assemblies in front instead of skis. The object is to improve the steerability as well as to obtain a more efficient suspension of the front part.

Therefore, an object of the invention is to provide a design of a vehicle of the kind in question in order to produce an efficient steering and driving of the vehicle, also at high speeds, while retaining a chosen bearing capacity of the front steerable support members of the vehicle.

The object is attained by the invention.

The invention is defined in the appended independent claim.

Embodiments of the invention are defined in the appended dependent claims.

The spring-damper assembly that supports the drive-track device of the chassis may comprise a four-link mechanism, which carries the body via a joint that offers the support body a turning around a substantially vertical axis, the drive line to the drive-track device suitably having a universal joint or the like at this turning axis. The drive line has naturally also a universal-joint coupling at the transition between the turnable parts of the link mechanism and the chassis, in a manner conventional per se.

BRIEF DESCRIPTION OF THE DRAWINGS

In the following, the invention will be described by way of examples, reference being made to the appended drawing, which schematically and untrue to scale depicts parts essential to the invention.

FIG. 1 shows a plan view of a snow scooter according to the invention.

FIG. 2 schematically shows a sectioned view, taken along line II-II in FIG. 1.

FIG. 3 shows a schematic view taken along line III-III in FIG. 1.

DETAILED DESCRIPTION OF THE INVENTION

The scooter has a chassis 1, which at the front end thereof in the direction of travel carries two laterally spaced-apart drive-track assemblies 10, and which at the rear end 2 thereof can be carried from the ground in an arbitrary way, for instance by a ski, a wheel, a central drive-track assembly or the like.

From FIG. 2, it can be seen that each track assembly 10 is carried from the chassis 11 via a suspension mechanism of four-link type, comprising two vertically spaced-apart generally horizontally extending arms 14, 15, which are turningly mounted 12, 13 at the chassis 11 and connect to two vertically spaced-apart fulcrums of a carrying body 16. The track assembly 10 has an upper attachment 92 for a (not shown) shock absorber carried by the chassis 11. A spring-damper leg 7 is shown supporting the link arm 15 in the vertical direction from the chassis 11. Via a generally vertically oriented rotary mounting, the body 16 is linked to a carrying element 19. The carrying element 19 carries a frame 39, which is turnably mounted on the element 19 around a substantially horizontal axis. The frame 39 extends in the direction of travel and the turning axis thereof extends transverse to the direction of travel.

It can be seen that a drive shaft extends through a central mounting in the element 19 and carries a chain sprocket 27. The drive shaft has couplings 32, 29 positioned to allow the drive shaft to follow the link mechanism, which turnably couples the assembly 10 to the chassis 11, in a manner conventional per se.

The frame 39 carries support rollers 42, return rollers 40 and drive rollers 44 for the endless track 50. At the front end of the frame, there is a cogwheel, which is driven from the chain sprocket 27 via a chain and which is coaxially drive-coupled to the drive roller 44 at the foremost upper turning point of the track 50. The drive roller is suitably toothed for the engagement with the corresponding recesses on the inside of the track 50. The chain transmission may naturally be replaced by some other known type of transmission, for instance a series of universal couplings interconnected via intermediate bar sections.

The frame 39 comprises struts 60, 64, which are length adjustable to allow alteration of the tension of the driving chain and the tension of the track 50, respectively. Particularly in FIG. 3, it can be seen that the element 18 carries a radially projecting arm 17, which via a springing and damped unit (having a spring damping leg 71 and a damped cylinder 70) rests against a support roller 42 of the track 50 at a radial distance from the pivot-mounting centre of the frame of the element 18. Possibly, the spring-damper leg 71 may be adjustable in respect of the neutral-position length.

Finally, it can be seen that the carrying bodies 16, via pivot joints 23, are connected in parallel with a steering link 24, so that the track assemblies 10 are coupled for parallel motion upon deflection from the longitudinal direction of the vehicle, by the fact that the linking points 23 of the link 24 are situated uniformly spaced-apart from the pivot mountings 21 in the longitudinal direction of the vehicle. Via a conventional steering gear 25, the link 24 is coupled to a steering rod 26, which can be rotated by means of a conventional handlebar 27.

By the construction according to the invention, the scooter will be pulled by the track assemblies situated afore, which are resiliently suspended from the chassis of the scooter and are steerable by a steering device that is conventional per se.

In a manner conventional per se, the drive shaft is coupled to a gear carried by the carrying body 16 of the drive unit via drive-shaft couplings.

By the fact that the frame 39 of the track assembly is turnable around an axis coinciding with the axis of the chain sprocket 27, favourable structural conditions are attained, and furthermore a relatively simple, damped and possibly drive-adjustable vibration damping of the track-carrying frame 39 of the track assembly 10 is attained.

The invention claimed is:

1. A tracked vehicle, comprising:

two laterally spaced-apart front drive-track assemblies (10), each of which is pivotable around a substantially vertical axis and which are coupled for common turning, each drive-track assembly being carried by a vehicle chassis (11) via a vertically movable link device, which rests against the chassis via a spring-damper assembly (7), the drive-track assemblies being mechanically coupled by a parallel steering mechanism (23-26), which is maneuverable by a driver of the vehicle, wherein each drive-track assembly comprises a frame (39), which is pivotally mounted on a carrying element (19) carried by the link device so that the frame (39) is pivotable around a horizontal axis, and wherein a spring-damping leg 71 couples the frame (39) to the carrying element (19) at a distance from the turning axis of the frame (39).

2. Tracked vehicle according to claim 1, wherein a drive shaft of the vehicle extends through a central opening through the carrying element (19), the drive-track assembly comprises an endless circumferential running track, and a transmission (27) is coupled between the drive shaft and a driving wheel, which engages with the inside of the running track and which is carried by the track-assembly frame (39).

3. Tracked vehicle according to claim 2, wherein the driving wheel (44) forms an upper front return point of the running track.

4. Tracked vehicle according to claim 1, wherein the vehicle is a snow scooter.

* * * * *